United States Patent [19]

Inoue et al.

[11] Patent Number: 4,562,136
[45] Date of Patent: Dec. 31, 1985

[54] TWO-COMPONENT DRY-TYPE DEVELOPER

[75] Inventors: Satoru Inoue, Mishima; Mitsuru Uchida, Susono; Kimitoshi Yamaguchi, Numazu; Mitsuo Aoki, Numazu; Masami Tomita, Numazu; Chiaki Uematsu, Fuji, all of Japan

[73] Assignee: Ricoh Company, Ltd., Tokyo, Japan

[21] Appl. No.: 669,749

[22] Filed: Nov. 7, 1984

Related U.S. Application Data

[63] Continuation-in-part of Ser. No. 471,387, Mar. 2, 1983, abandoned.

[30] Foreign Application Priority Data

Mar. 5, 1982 [JP] Japan .................................. 57-033979
Apr. 24, 1982 [JP] Japan .................................. 57-068075
May 17, 1982 [JP] Japan .................................. 57-081571

[51] Int. Cl.$^4$ ............................................ G03G 9/08
[52] U.S. Cl. ...................................... 430/107; 430/110
[58] Field of Search ............... 430/106, 109, 110, 111, 430/107

[56] References Cited

U.S. PATENT DOCUMENTS 4,404,270 9/1983 Higashida et al. ................... 430/110

FOREIGN PATENT DOCUMENTS 0127569 10/1980 Japan ................................... 430/108

Primary Examiner—John L. Goodrow
Attorney, Agent, or Firm—Flynn, Thiel, Boutell & Tanis

[57] ABSTRACT

A two-component dry-type developer which comprises carrier particles coated with silicone resin and toner particles containing as a negative polarity control agent a monoazo metal complex dye. As the monoazo metal complex dye, the following metal complex dye is preferable for use in this two-component dry-type developer:

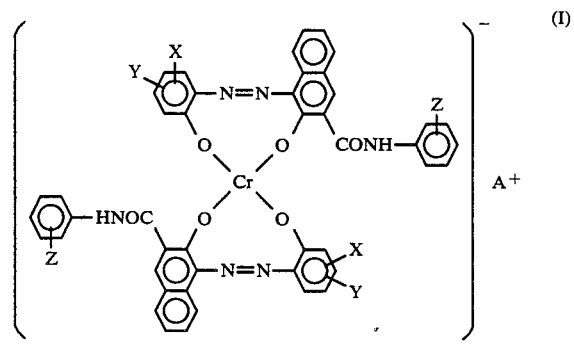

wherein X, Y and Z independently represent hydrogen, halogen, a carboxyl group, a hydroxyl group, a nitro group, a sulfo group or a sulfonamide group; and $A^{+\cdot}$ represents $H^+$, $K^+$, $Na^+$ or an aliphatic ammonium cation.

14 Claims, No Drawings

TWO-COMPONENT DRY-TYPE DEVELOPER

This application is a continuation-in-part, of U.S. Ser. No. 471,387, filed Mar. 2, 1983 now abandoned.

BACKGROUND OF THE INVENTION

The present invention relates to a two-component dry-type developer for developing latent electrostatic images to visible images, for use in electrophotography, electrostatic recording methods and electrostatic printing methods.

Conventionally, as a developer for use in these fields, the so-called two-component dry-type developer is known, which comprises carrier particles and toner particles. In the two-component dry-type developer, the particle size of the toner particles is very much smaller than the particle size of the carrier particles, and the toner particles are triboelectrically attracted to the carrier particles and are in fact held on the surface of the carrier particles. That electric attraction between the toner particles and the carrier particles is caused by the friction between the toner particles and the carrier particles. When the toner particles held on the carrier particles are brought near or into contact with a latent electrostatic image, the electric field of the latent electrostatic image works on the toner particles to separate the toner particles from the carrier particles overcoming the bonding of the toner particles to the carrier particles, with the result that the toner particles are attracted towards the latent electrostatic image and the latent electrostatic image is thus developed to a visible image. In the case of the two-component dry-type developer, only the toner particles are consumed as the development is performed. Therefore, it is necessary to replenish the toner particles in the course of repeated development by the apparatus.

Further, it is necessary to triboelectrically charge the carrier particles to the desired polarity and with a sufficient amount of charges, and to maintain the amount of the charges and the polarity for a long period of time during use. In the case of a conventional two-component type developer, it is apt to occur that the resin contained in and released from the toner particles in the course of the mechanical mixing of the toner particles and the carrier particles in the development apparatus, eventually covers the surface of the carrier particles. Once the surface of the carrier particles is covered with the resin, which is generally referred to as the "spent phenomenon," such carrier particles no longer function as active carrier particles, that is, carrier particles which contribute to development. As a result, the charging characteristics of the carrier particles in the conventional two-component type developer deteriorate with time while in use. In the end, it is necessary to replace the entire developer by new developer.

In order to prevent the spent phenomenon, a method of coating the surface of carrier particles with any of several different resins has been proposed.

For instance, in the case of carrier particles coated with tetrafluoroethylene fluorocarbon polymers, the spent phenomenon occurs only slightly due to the low surface energy thereof. However, since tetrafluoroethylene fluorocarbon polymers are on the extreme negative side in terms of the triboelectric charging series, carrier particles coated with tetrafluoroethylene fluorocarbon polymers cannot be used with toner particles which are to be charged to a negative polarity.

Further, in the case of carrier particles coated with silicone resin, which also has a low surface energy, silicone resin, too, is considerably on the negative side in terms of the triboelectric charging series (although not as extremely so as in the case of tetrafluoroethylene fluorocarbon polymers). Therefore, it has never been considered that carrier particles coated with silicone resin could be used for charging toner particles to a negative polarity.

As for toner particles, many negative polarity control agents for making toner particles easily chargeable to a negative polarity by addition thereof to the toner particles have been proposed, for instance, in Japanese Laid-Open Patent Applications Nos. 49-21151, 49-27229 and 52-67331. However, the negative polarity control agents disclosed in those Japanese Laid-Open Patent Applications are effective to control the charging polarity of non-coated carrier particles, but they are not effective for practical use to control the charging polarity of toner particles which are triboelectrically charged to a negative polarity by friction with carriers coated with silicone resin. This is because, of those polarity control agents, some are effective for initial charging of toner particles to a negative polarity when carrier particles coated with silicone resin are employed, but the polarity control effect of the polarity control agents does not last long enough for practical use. Others are not capable from the beginning of controlling toner particles so as to permit them to be charged to a negative polarity with sufficiently high charges.

Further, the charge quantity distribution range of toner particles containing such polarity control agents is broad and some of the toner particles are inversely charged to a positive polarity with time while in use in development. In the end, the toner particles are deposited on the background of latent electrostatic images to be developed. When the charge quantity distribution range of toner particles becomes too broad, the toner particles do not provide high image quality in a stable manner, since some toner particles with a particular range of charge quantity are apt to be exclusively consumed.

SUMMARY OF THE INVENTION

It is therefore an object of the present invention to provide a two-component dry-type developer comprising toner particles and carrier particles, with toner particles capable of being negatively charged sufficiently for practical use, with the polarity being maintained while in use for a long period of time, even though silicone resin, which substantially prevents the so-called spent developer phenomenon and is on the negative side in terms of the triboelectric charging series, is coated on the carrier particles.

Another object of the present invention is to provide a two-component dry-type developer of the above type, in which the charge quantity distribution of the toner particles is maintained within a narrow range while in use for a long period of time, without being affected by changes in ambient conditions, such as changes in ambient temperature and humidity, so that high quality developed images without toner deposition on the background can be obtained.

The above objects of the present invention are attained by a two-component dry-type developer which comprises carrier particles coated with silicone resin and toner particles containing as a charge polarity control agent a monoazo metal complex dye of the following formula:

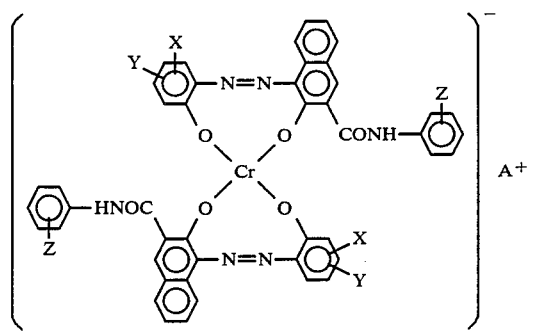

wherein X, Y and Z independently represent hydrogen, halogen, a carboxyl group, a hydroxyl group, a nitro group, a sulfo group or a sulfonamide group; and $A^+$ represents $H^+$, $K^+$, $Na^+$ or an aliphatic ammonium cation.

DETAILED DESCRIPTION OF THE PREFERRED EMBODIMENTS

A two-component dry-type developer according to the present invention comprises carrier particles coated with silicone resin and toner particles containing as a charge polarity control agent a monoazo metal complex dye.

As a silicone resin coated on the carrier particles, for example, the following room-temperature-setting-type silicone resins can be employed:

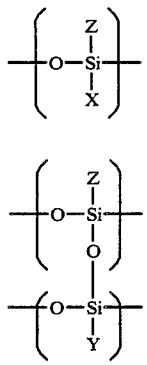

wherein X, Y and Z independently represent hydrogen, halogen, a hydroxy group, a methoxy group, a lower alkyl group with 1 to 4 carbon atoms, or a phenyl group.

The following commercially available silicone resins can also be employed in the present invention: Silicone resins KR 271, KR 255 and KR 152 made by The Shin-Etsu Chemical Co., Ltd.; and silicone resins SR 2400, SH 840 and SR 2406 made by Toray Silicone Co., Ltd.

It is preferable that the above silicone resins be heated at temperatures ranging from 200° C. to 300° C. after coating in order that the amount of the unhardened silicone resin in the entire silicone resin be not more than 30 wt.%. This is because, by that heating, the strength of the coated silicone resin layer is increased as compared with the unheated silicone resin, so that scratches in and cracking of the layer and the spent phenomenon are significantly reduced, and the charge application properties of the carrier particles to the toner particles are very much stabilized.

When the room-temperature-setting-type silicone resin is not subjected to the above-described heat treatment at temperatures ranging from 200° C. to 300° C., the amount of the unhardened silicone resin in the entire silicone resin is about 50 wt.%.

The amount of the unhardened silicone resin in the silicone resin layer coated on the carrier particles can be easily determined, since the unhardened silicone resin is soluble in an organic solvent, such as toluene or xylene, and the amount of the dissolved silicone resin can be determined without difficulty. Thus, the ratio of the unhardened silicone resin to the entire silicone resin in the silicone resin layer coated on the carrier particles can be determined by comparing the absolute amount of the dissolved silicone resin with the absolute amount of the entire amount of the silicone resin in the coated layer.

As the core material of the carrier particles which are coated with the above-described silicone resin, metallic or non-metallic particles with an average particle size ranging from 20 μm to 1000 μm, preferably ranging from 5 μm to 500 μm, such as particles of sand, cobalt, iron, iron oxide, copper, nickel, zinc, aluminum, brass or glass, can be employed.

The silicone resins can be coated on the core material by conventional procedures, for instance, by dissolving the silicone resin in an organic solvent and spraying the core material with the resin solution.

The toner particles for use in the present invention comprise a resin component and a monoazo metal complex dye of the following formula as a negative polarity control agent, and, if necessary, a coloring agent, such as carbon black:

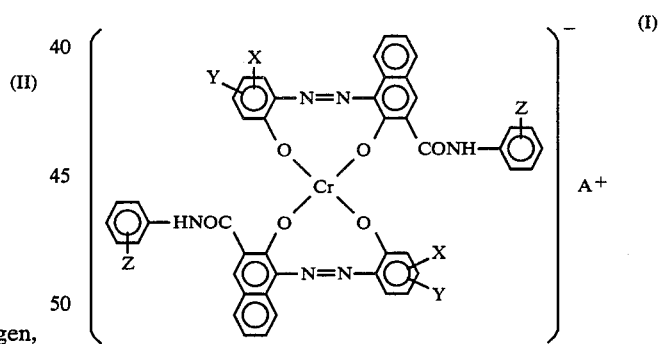

wherein X, Y and Z represent independently hydrogen, halogen, a carboxyl group, a hydroxyl group, a nitro group, a sulfo group or a sulfonamide group; and $A^+$ represents $H^+$, $K^+$, $Na^+$ or an aliphatic ammonium cation.

It is preferable that the amount of the metal complex dye be in the range of 0.1 wt.% to 15 wt.%, more preferably in the range of 0.5 wt.% to 10 wt.%, with respect to the entire amount of resin component contained in the toner particles.

When the amount of the metal complex dye is less than 0.1 wt.%, electric charging of the toner particles is difficult, while, when the amount of the metal complex dye is about 15 wt.%, the effect as the negative polarity control agent of the metal complex dye as maximized, and additional metal complex dye in an amount of more than 15 wt.% is for this purpose wasted.

As a resin for use in the toner particles, for example, polystyrene, acrylic resin, polyvinyl chloride, polyvinyl acetate, epoxy resin, alkyd resin, polyethylene, phenolic resin, butyral resin, polyester resin, xylene resin and polyamide resin can be employed.

It is preferable that, as the main component of the resins contained in the toner particles, a vinyl polymer with an average molecular weight of 100,000 or more, containing 70 wt.% or more of styrene, be contained in an amount ranging from 50 wt.% to 100 wt.% of the entire resin components in the toner particles. This is because the toner particles containing as the main component such vinyl polymer in the above-mentioned amount have a relatively sharp charge quantity distribution and are capable of consistently yielding fairly good image quality for a long period of time during the copying process.

When necessary, a coloring agent, such as carbon black, can be contained in the toner particles.

The toner particles for use in the present invention can be prepared by a conventional procedure, for example, by mixing the resin components and the metal complex dye and, if necessary, with addition thereto of a coloring agent, such as carbon black, kneading the mixture by heat rollers, crushing the hardened lump into powder when cooled, and classifying the powder.

It is preferable that the thus prepared toner particles be mixed with the carrier particles in such an amount as to cover 30% to 90% of the silicone coated surface of the carrier particles.

Referring to the following examples, embodiments of a two-component dry-type developer according to the present invention will now be explained in detail.

EXAMPLE 1

The following components were mixed, kneaded by heat rollers, crushed and classified under a conventional procedure, so that toner particles with an average particle size of 6 μm were prepared:

|  | Parts by Weight |
| --- | --- |
| Polystyrene | 85 |
| Metal complex dye of formula (I)-1 | 1 |
| Carbon black | 14 |

Formula (I)-1

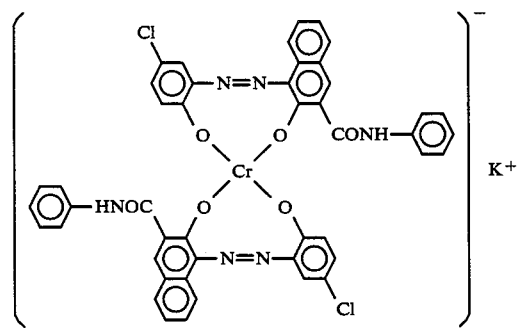

1 kg of a silicone resin (KR 250 made by The Shin-Etsu Chemical Co., Ltd.) was coated on 5 kg of iron oxide particles with a particle size of 100 μm in a fluidized-bed-type coating apparatus. The iron oxide particles coated with the silicone resin were then heated at 250° C. for 2 hours in an electric furnace, so that carrier particles for use in the present invention were prepared. The amount of unhardened silicone resin in the entire silicone resin which was coated on the iron oxide particles was 18 wt.%.

2.5 parts by weight of the toner particles and 97.5 parts by weight of the carrier particles were mixed, so that a two-component dry-type developer No. 1 according to the present invention was prepared.

The thus prepared two-component dry-type developer No. 1 was subjected to a copy test in which 100,000 copies were made, as the toner particles were replenished when necessary, by use of a commercially available copying machine, FT-6400, made by Ricoh Co., Ltd., in which positive latent electrostatic images were formed and developed by a magnetic brush development method.

The result was that clear copies were obtained and the electric charge quantity of the toner particles was −15 μC/g and that electric charge quantity was not changed at all during the copy test. After the copy test, the surface of the carrier particles was inspected by a scanning-type electron microscope. Almost no scratches were observed on the silicone coated surface of the carrier particles.

The developer No. 1 was then subjected to a charge reverse test for determining the amount of the toner particles whose polarity had been reversed during the use for development.

In this charge reverse test, the developer was caused to flow between a pair of parallel electrodes with a space of 2 mm therebetween, with a voltage of 300 V (DC) applied between the two electrodes. The toner particles deposited on the electrode with the same polarity as the initial polarity of the toner particles were picked up by applying thereto a transparent adhesive tape and then applying the transparent adhesive tape, with the toner particles to a sheet of white paper. The reflection density of the tape was measured by a Macbeth densitometer. As a result, the reflection density was determined to be 0.20. This indicated that there were substantially no toner particles whose polarity had been reversed.

EXAMPLE 2

The following components were mixed, kneaded by heat rollers, crushed and classified under a conventional procedure, so that toner particles with an average particle size of 8 μm were prepared:

|  | Parts by Weight |
| --- | --- |
| n-butylmethacrylate-styrene copolymer | 90 |
| Metal complex dye of formula (I)-2 | 1 |
| Carbon black | 9 |

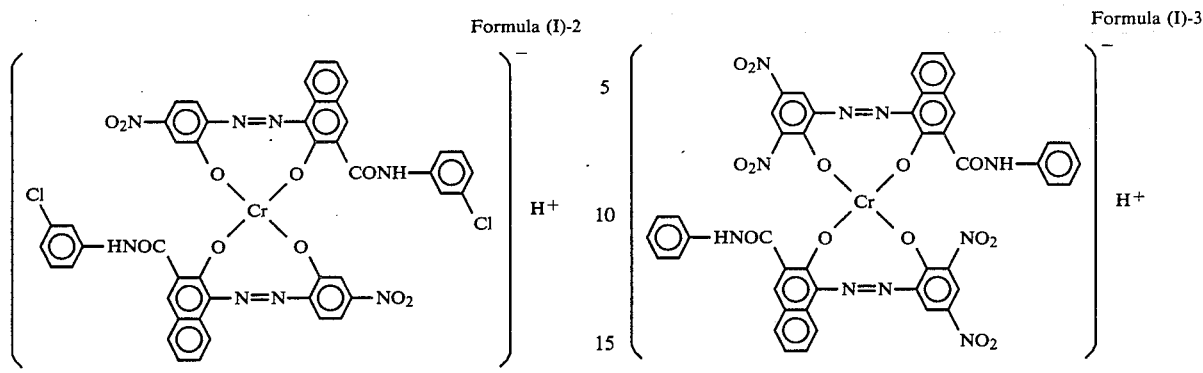

Formula (I)-2

Formula (I)-3

1 kg of a silicone resin (SR 2406 made by Toray Silicone Co., Ltd.) was coated on 5 kg of iron oxide particles with a particle size of 70 μm in a fluidized-bed-type coating apparatus. The iron oxide particles coated with the silicone resin were then heated at 250° C. for 2 hours in an electric furnace, so that carrier particles for use in the present invention were prepared. The amount of unhardened silicone resin in the entire silicone resin which was coated the iron oxide particles was 20 wt.%.

3.0 parts by weight of the toner particles and 97.0 parts by weight of the carrier particles were mixed, so that a two-component dry-type developer No. 2 according to the present invention was prepared.

The thus prepared two-component dry-type developer No. 2 was subjected to the same copy test as in Example 1, in which 100,000 copies were made, with the toner being replenished when necessary, by use of the same copying machine as that employed in Example 1.

The result was that clear copies were obtained and the electric charge quantity of the toner particles was $-16$ μC/g throughout the copy test. After the copy test, the surface of the carrier particles was inspected by a scanning-type electron microscope. Almost no scratches were observed on the silicone coated surface of the carrier particles.

The developer No. 2 was then subjected to the same charge reverse test as in Example 1.

The result was that the reflection density was 0.21. This indicated that there were substantially no toner particles whose polarity had been reversed.

EXAMPLE 3

The following components were mixed, kneaded by heat rollers, crushed and classified under a conventional procedure, so that toner particles with an average particle size of 7 μm were prepared:

|  | Parts by Weight |
|---|---|
| Polystyrene | 85 |
| (D-125 made by Hercules Inc.) | |
| Metal complex dye of formula (I)-3 | 2 |
| Carbon black | 13 |

2.5 parts by weight of the thus prepared toner particles and 97.5 parts by weight of the carrier particles prepared in Example 1 were mixed, so that a two-component dry-type developer No. 3 according to the present invention was prepared.

The thus prepared two-component dry-type developer No. 3 was subjected to the same copy test as in Example 1, in which 100,000 copies were made, with the toner being replenished when necessary, by use of the same copying machine as that employed in Example 1. The result was that clear copies were obtained throughout the test.

The initial electric charge quantity of the toner particles have $-18$ μC/g, which electric charge quantity was found to be decreased to $-16$ μC/g at the end of the 100,000-copy test. This decrease, however, was negligible, since the image quality did not deteriorate at all throughout the copy test. After the copy test, the surface of the carrier particles was inspected by a scanning-type electron microscope. Almost no scratches were observed on the silicone coated surface of the carrier particles. Further, the developer No. 3 was subjected to the same charge reverse test as in Example 1. The result was that the reflection density was 0.20, and there were substantially no toner particles whose polarity had been reversed during the copy test.

EXAMPLE 4

Example 1 was repeated except that the metal complex dye of the formula (I)-1 employed in Example 1 was replaced by the following metal complex dye (I)-4, so that a two-component dry-type developer No. 4 according to the present invention was prepared:

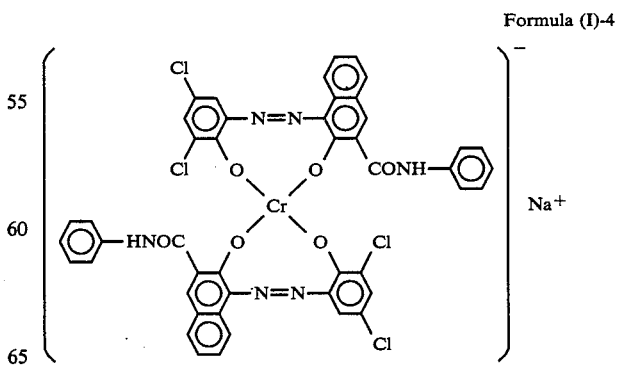

Formula (I)-4

The thus prepared two-component dry-type developer No. 4 was subjected to the same copy test as in Example 1, in which 100,000 copies were made, with the toner particles being replenished when necessary, by use of the same copying machine as that employed in Example 1. The result was that clear copies were obtained throughout the test.

The initial electric charge quantity of the toner particles was $-18$ μC/g, which was maintained throughout the copy test.

After the copy test, the surface of the carrier particles was inspected by a scanning-type electron microscope. Almost no scratches were observed on the silicone coated surface of the carrier particles. Further, the developer No. 4 was subjected to the same charge reverse test as in Example 1. The result was that the reflection density was 0.21, and there were substantially no toner particles whose polarity had been reversed during the copy test.

EXAMPLE 5

Example 1 was repeated except that the metal complex dye of the formula (I)-1 employed in Example 1 was replaced by the following metal complex dye (I)-5, so that a two-component dry-type developer No. 5 according to the present invention was prepared:

Formula (I)-5

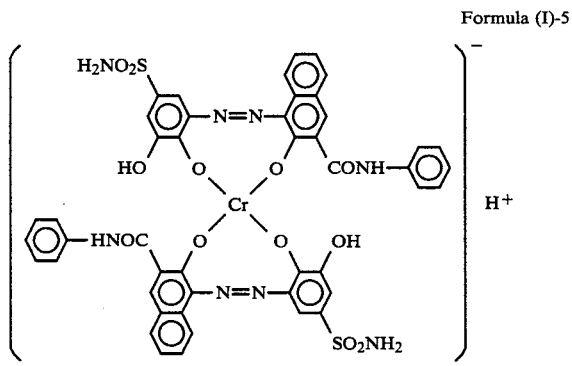

The thus prepared two-component dry-type developer No. 5 was subjected to the same copy test as in Example 1, in which 100,000 copies were made, with the toner particles being replenished when necessary, by use of the same copying machine as that employed in Example 1. The result was that clear copies were obtained throughout the test.

The initial electric charge quantity of the toner particles was $-16$ μC/g, which was maintained throughout the copy test.

After the copy test, the surface of the carrier particles was inspected by a scanning-type electron microscope. Almost no scratches were observed on the silicone coated surface of the carrier particles. Further, the developer No. 5 was subjected to the same charge reverse test as in Example 1. The result was that the reflection density was 0.22, and there were substantially no toner particles whose polarity had been reversed during the copy test.

EXAMPLE 6

The following components were mixed, kneaded by heat rollers, crushed and classified under a conventional procedure, so that toner particles with an average particle size of 6 μm were prepared, which were the same as those employed in Example 1:

|  | Parts by Weight |
| --- | --- |
| Polystyrene | 85 |
| Metal complex dye of formula (I)-1 | 1 |
| Carbon black | 14 |

1 kg of a silicone resin (SR 2411 made by Toray Silicone Co., Ltd.) was coated on 5 kg of ferrite powder (Fe.Zn.Ni Ferrite) with a particle size of 100 μm in a fluidized-bed-type coating apparatus. The ferrite powder coated with the silicone resin were heated at 250° C. for 2 hours in an electric furnace, so that carrier particles for use in the present invention were prepared. The amount of unhardened silicone resin in the entire silicone resin which was coated on the iron oxide particles was about 20 wt.%.

2.5 parts by weight of the toner particles and 97.5 parts by weight of the carrier particles were mixed, so that a two-component dry-type developer No. 6 according to the present invention was prepared.

The thus prepared two-component dry-type developer No. 6 was subjected to the same copy test as in Example 1, in which 100,000 copies were made, with the toner being replenished when necessary, by use of the same copying machine as that employed in Example 1.

The result was that clear copies were obtained and the electric charge quantity of the toner particles was $-17$ μC/g and that electric charge quantity was not changed at all during the copy test. After the copy test, the surface of the carrier particles was inspected by a scanning-type electron microscope. Almost no scratches were observed on the silicone coated surface of the carrier particles.

The developer No. 6 was then subjected to the same charge reverse test as in Example 1.

The result was that the reflection density was 0.20. This indicated that there were substantially no toner particles whose polarity had been reversed.

EXAMPLE 7

Toner particles with an average particle size of 7 μm were prepared in accordance with the following formulation (which was the same as that in Example 3) under the same conditions as those in Example 3.

|  | Parts by Weight |
| --- | --- |
| Polystyrene (D-125 made by Hercules Inc.) | 85 |
| Metal complex dye of formula (I)-3 | 2 |
| Carbon black | 13 |

Carrier particles were prepared in accordance with the same formulation as that in Example 6, under the same conditions as those in Example 6, except that the silicone resin coated ferrite powder was heated at 280° C. for 2 hours in an electric furnace. The amount of unhardened silicone resin in the entire silicone resin which was coated on the ferrite powder was 30 wt.%.

3.0 parts by weight of the toner particles and 97.0 parts by weight of the carrier particles were mixed, so that a two-component dry-type developer No. 7 according to the present invention was prepared.

The thus prepared two-component dry-type developer No. 7 was subjected to a similar copy test to that in Example 1, in which 150,000 copies were made, with the toner being replenished when necessary, by use of the same copying machine as that employed in Example 1.

The result was that clear copies were obtained throughout the copy test.

The initial electric charge quantity of the toner particles was −25 μC/g, which electric charge quantity was found to have decreased to −21 μC/g at the end of the 150,000-copy test. This decrease, however, was negligible, since the image quality did not deteriorate at all throughout the copy test.

quantity of the toner particles was −23 μC/g, which electric charge quantity was found to have decreased to −20 μC/g at the end of the 150,000-copy test.

EXAMPLE 9

Example 1 was repeated except that the metal complex dye of the formula (I)-1 employed in Example 1 was replaced by the following metal complex dye of formula (I)-6, so that a two-component dry-type developer No. 4 according to the present invention was prepared:

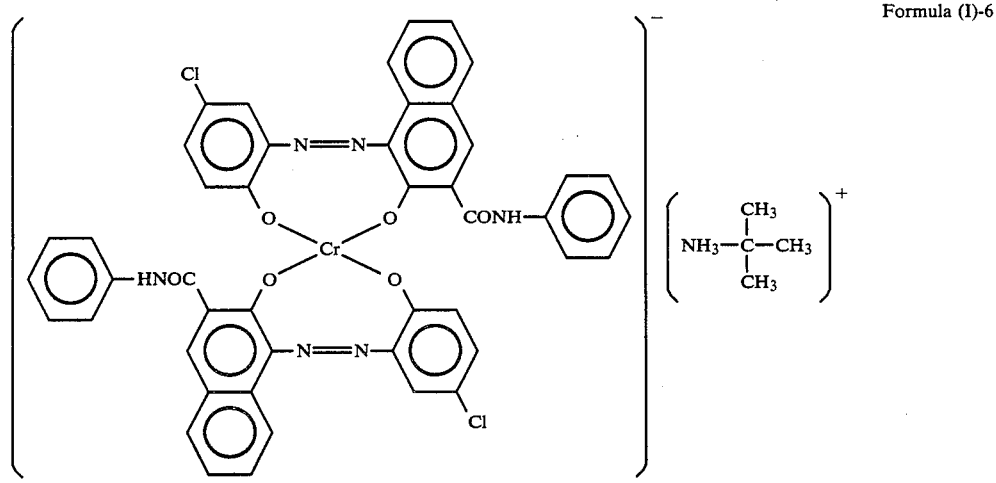

Formula (I)-6

After the copy test, the surface of the carrier particles was inspected by a scanning-type electron microscope. Almost no scratches were observed on the silicone coated surface of the carrier particles. Further, the developer No. 7 was subjected to the same charge reverse test as in Example 1. The result was that the reflection density was 0.20, and there were substantially no toner particles whose polarity had been reversed during the copy test.

EXAMPLE 8

Example 8 was repeated except that the silicone resin (SR 2411 made by Toray Silicone Co., Ltd.) employed in Example 7 was replaced by a silicone resin of the following formula, with an average molecular weight of 2000, so that a two-component dry-type developer No. 8 according to the present invention was prepared:

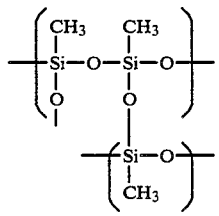

The thus prepared two-component dry-type developer No. 8 was subjected to the same copy test, the same measurement of the electric charge quantity, the same inspection of the surface of the carrier particles by a scanning-type electron microscope and the same charge reverse test as in Example 7.

The results were entirely the same as those observed in Example 7, except that the initial electric charge The thus prepared two-component dry-type developer No. 9 was subjected to the same copy test, the same measurement of the electric charge quantity, the same inspection of the surface of the carrier particles by a scanning-type electron microscope and the same charge reverse test as in Example 1.

The initial electric charge quantity of the toner particles was −23 μC/g, which electric charge quantity was found to have decreased to −21 μC/g at the end of the 100,000-copy test. This decrease, however, was negligible, since the image quality did not deteriorate at all throughout the copy test.

After the copy test, the surface of the carrier particles was inspected by a scanning-type electron microscope. Almost no scratches were observed on the silicone coated surface of the carrier particles. Further, the developer No. 9 was subjected to the same charge reverse test as in Example 1. The result was that the reflection density was 0.21, and there were substantially no toner particles whose polarity had been reversed during the copy test.

EXAMPLE 10

In accordance with the following formulation under the same procedure as that described in Example 1, toner particles with an average particle size of 8 μm were prepared:

|  | Parts by Weight |
|---|---|
| Styrene-n-butylrethacrylate polymer (average molecular weight 120,000; the content of styrene 80 wt. %) | 88 |
| Metal complex dye of formula (I)-1 (which was employed in Example 1) | 2 |

-continued

| | Parts by Weight |
|---|---|
| Carbon black | 10 |

1.5 kg of a silicone resin (SR 2411 made by Toray Silicone Co., Ltd.) was coated on 5 kg of iron oxide particles with a particle size of 100 μm in a fluidized-bed-type coating apparatus. The iron oxide particles coated with the silicone resin were then heated at 250° C. for 2 hours in an electric furnace, so that carrier particles for use in the present invention were prepared. The amount of unhardened silicone resin in the entire silicone resin which was coated on the iron oxide particles was 18 wt.%.

2.5 parts by weight of the toner particles and 97.5 parts by weight of the carrier particles were mixed, so that a two-component dry-type developer No. 10 according to the present invention was prepared.

The thus prepared two-component dry-type developer No. 10 was subjected to the same copy test, the same measurement of the electric charge quantity, the same inspection of the surface of the carrier particles by a scanning-type electron microscope and the same charge reverse test as in Example 1.

The result was that clear copies were obtained throughout the copy test.

The electric charge quantity of the toner particles was $-22$ μC/g, which was maintained throughout the 100,000-copy test, and the image quality did not deteriorate at all throughout the copy test.

After the copy test, the surface of the carrier particles was inspected by a scanning-type electron microscope. No scratches were observed on the silicone coated surface of the carrier particles. Further, the developer No. 10 was subjected to the same charge reverse test as in Example 1. The result was that the reflection density was 0.20, and there were substantially no toner particles whose polarity had been reversed during the copy test.

EXAMPLE 11

In accordance with the following formulation under the same procedure as that described in Example 1, toner particles with an average particle size of 5 μm were prepared:

| | Parts by Weight |
|---|---|
| Styrene-n-butylmethacrylate polymer (average molecular weight 180,000; the content of styrene 75 wt. %) | 84 |
| Metal complex dye of formula (I)-3 (which was employed in Example 3) | 1 |
| Carbon black | 15 |

1 kg of a silicone resin SR 2406 made by Toray Silicone Co., Ltd.) was coated on 5 kg of iron oxide particles with a particles size of 70 μm in a fluidized-bed-type coating apparatus. The iron oxide particle coated with the silicone resin were then heated at 250° C. for 2 hours in an electric furnace, so that carrier particles for use in the present invention were prepared. The amount of unhardened silicone resin in the entire silicone resin which was coated on the iron oxide particles was 20 wt.%.

3.5 parts by weight of the toner particles and 96.5 parts by weight of the carrier particles were mixed, so that a two-component dry-type developer No. 11 according to the present invention was prepared.

The thus prepared two-component dry-type developer No. 11 was subjected to the same copy test, the same measurement of the electric charge quantity, the same inspection of the surface of the carrier particles by a scanning-type electron microscope and the same charge reverse test as in Example 1.

The result was that clear copies were obtained throughout the copy test.

The electric charge quantity of the toner particles was $-18$ μC/g, which was maintained throughout the 100,000-copy test, and the image quality did not deteriorate at all throughout the copy test.

After the copy test, the surface of the carrier particles was inspected by a scanning-type electron microscope. No scratches were observed on the silicone coated surface of the carrier particle. Further, the developer No. 11 was subjected to the same charge reverse test as in Example 1. The result was that the reflection density was 0.21, and there were substantially no toner particles whose polarity had been reversed during the copy test.

COMPARATIVE EXAMPLE

Example 1 was repeated except that the metal complex dye of the formula (I)-1 employed in Example 1 was replaced by the following metal complex dye (II) so that a comparative two-component dry-type developer was prepared:

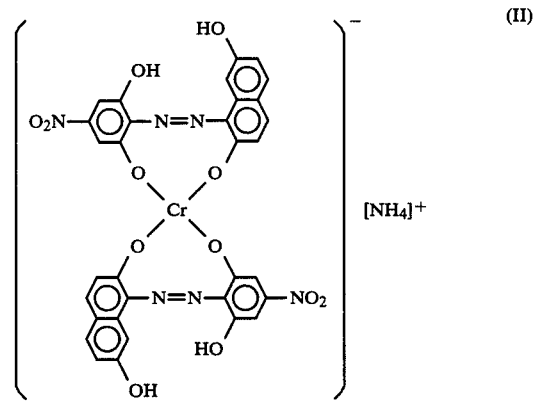

The thus prepared comparative two-component dry-type developer was subjected to the same copy test, the same measurement of the electric charge quantity, and the same charge reverse test as in Example 1.

The result was that the initial electric charge quantity of the toner particles was $-10$ μC/g, which electric charge quantity was found to have decreased to $-5$ μC/g at the end of the 100,000-copy test. In this case, the obtained image density was too low in the copy test from the beginning to be employed for practical use, and at the final stage of the copy test, almost no visible images were formed.

EXAMPLE 12

Example 1 was repeated except that the metal complex dye of the formula (I)-1 employed in Example 1 was replaced by the following metal complex dye (I)-7, so that a two-component dry-type developer No. 12 according to the present invention was prepared:

Formula (I)-7

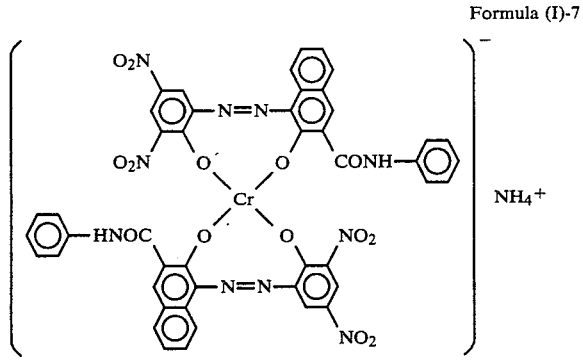

The thus prepared two-component dry-type developer No. 12 was subjected to the same copy test as in Example 1, in which 100,000 copies were made, with the toner particles being replenished when necessary, by use of the same copying machine as that employed in Example 1. The result was that clear copies were obtained throughout the test.

The initial electric charge quantity of the toner particles was $-15$ $\mu C/g$, which was maintained throughout the copy test.

After the copy test, the surface of the carrier particles was inspected by a scanning-type electron microscope. Almost no scratches were observed on the silicone coated surface of the carrier particles. Further, the developer No. 12 was subjected to the same charge reverse test as in Example 1. The result was that the reflection density was 0.19, and there were substantially no toner particles whose polarity had been reversed during the copy test.

What is claimed is:

1. A two component dry type developer comprising carrier particles coated with a silicone resin and toner particles containing as a negative polarity control agent a monoazo metal complex dye of the formula

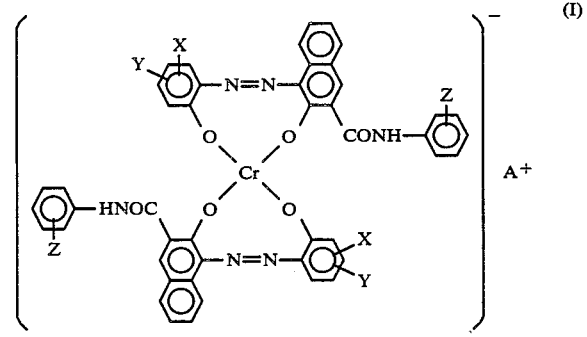

wherein X, Y and Z independently represent hydrogen, halogen, carboxy, hydroxy, nitro, sulfo or sulfonamide, and $A^+$ represents $H^+$, $NH_4^+$, $K^+$, $Na^+$ or an aliphatic ammonium cation.

2. A developer as claimed in claim 1, wherein said silicone resin coated on said carrier particles contains 30 wt.% or less of unhardened silicone resin out of the entire amount of silicone resin coated on said carrier particles.

3. A developer as claimed in claim 1, wherein said toner particles further comprise a synthetic resin component consisting essentially of a vinyl polymer with an average molecular weight of not less than 100,000, with 70 wt.% or more of a styrene component contained therein.

4. A developer as claimed in claim 1, wherein said toner particles further comprise a synthetic resin component consisting essentially of n-butylmethacrylate-styrene copolymer.

5. A developer as claimed in claim 2, wherein said toner particles contain a synthetic resin component and the amount of said metal complex dye is in the range of 0.1 wt.% to 15 wt.% based on the entire amount of said synthetic resin component contained in said toner particles.

6. A developer as claimed in claim 5, wherein said toner particles contain carbon black as a coloring agent.

7. A developer as claimed in claim 6, wherein said silicone resin consists essentially of repeating units having the formula:

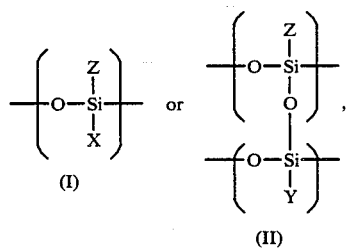

wherein X, Y and Z each represent hydrogen, halogen, hydroxy, methoxy, alkyl having 1–4 carbon atoms, or phenyl.

8. A developer as claimed in claim 6, wherein said carrier particles have an average particle size in the range of 20 to 1000 $\mu m$.

9. A two component dry developer for developing an electrostatic latent image, comprising a blend of toner particles and carrier particles, said toner particles being deposited on the surfaces of said carrier particles so as to cover 30% to 90% of the total surface of said carrier particles; said carrier particles consisting essentially of core particles having diameters in the range of 20 to 1000 $\mu m$ selected from the group consisting of particles of sand, cobalt, iron, iron oxide, ferrite, copper, nickel, zinc, aluminum, brass and glass, said core particles being coated with a silicone resin having repeating units of the formula:

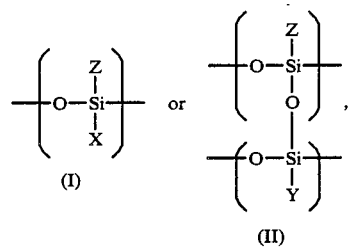

wherein X, Y and Z, each independently represent hydrogen, halogen, hydroxy, methoxy, alkyl having 1–4 carbon atoms, or phenyl, not more than about 30 wt.% of said silicone resin being unhardened; and said toner particles consist essentially of a synthetic resin selected from the group consisting of polystyrene, acrylic, polyvinyl chloride, epoxy, alkyd, polyethylene, phenolic, butyral, polyester, xylene and polyamide resins, and 0.1 to 15 wt.%, based on the amount of said resin, of a dye of the formula:

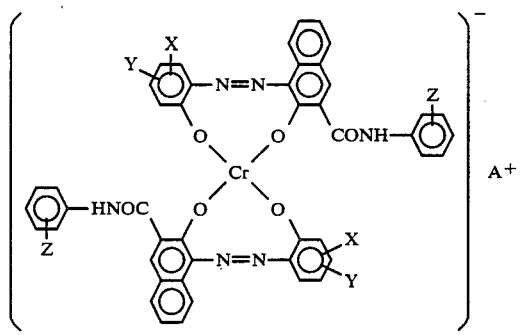

wherein X, Y and Z independently represent hydrogen, carboxy, hydroxy, nitro, sulfo or sulfonamide, and $A^+$ represents $H^+$, $NH_4^{30}$, $K^+$, $Na^+$ or an aliphatic ammonium cation.

10. A developer as claimed in claim 9, wherein said core particles are iron oxide or ferrite particles, and said synthetic resin is polystyrene or an n-butylmethacrylate-styrene copolymer.

11. A developer as claimed in claim 10, wherein said toner particles contain carbon black as a coloring agent.

12. A developer as claimed in claim 9, wherein said carrier particles are heated to a temperature in the range of 200° C. to 300° C. for a period sufficient to harden said silicone resin.

13. A developer as claimed in claim 12, wherein said core particles have diameters in the range of 50 to 500 μm, and the amount of said metal complex dye is 0.5 to 10 wt.%, based on said synthetic resin.

14. A developer as claimed in claim 9, wherein said synthetic resin contains 50 to 100 wt.% of a vinyl polymer having an average molecular weight of at least 100,000 and containing at least 70 wt.% of styrene.

* * * * *

UNITED STATES PATENT AND TRADEMARK OFFICE
CERTIFICATE OF CORRECTION

PATENT NO. : 4 562 136
DATED : December 31, 1985
INVENTOR(S) : Satoru Inoue et al It is certified that error appears in the above-identified patent and that said Letters Patent is hereby corrected as shown below:

Column 16, line 15; change "claim 6" to ---claim 1---.
           line 34; change "claim 6" to ---claim 1---.
Column 18, line 1; change "$NH_4^{30}$," to ---$NH_4^+$,---.

Signed and Sealed this

Tenth Day of June 1986

[SEAL]

Attest:

DONALD J. QUIGG

Attesting Officer      Commissioner of Patents and Trademarks

REEXAMINATION CERTIFICATE (833rd)
United States Patent
Inoue et al.

[11] B1 4,562,136
[45] Certificate Issued  Mar. 29, 1988

[54] TWO-COMPONENT DRY-TYPE DEVELOPER

[75] Inventors: Satoru Inoue, Mishima; Mitsuru Uchida, Susono; Kimitoshi Yamaguchi, Numazu; Mitsuo Aoki, Numazu; Masami Tomita, Numazu; Chiaki Uematsu, Fuji, all of Japan

[73] Assignee: Ricoh Company, Ltd., Tokyo, Japan

Reexamination Request:
No. 90/001,250, Jun. 1, 1987

Reexamination Certificate for:
Patent No.: 4,562,136
Issued: Dec. 31, 1985
Appl. No.: 669,749
Filed: Nov. 7, 1984

Certificate of Correction issued Jun. 10, 1986.

Related U.S. Application Data

[63] Continuation-in-part of Ser. No. 471,387, Mar. 2, 1983, abandoned.

[30] Foreign Application Priority Data

Mar. 5, 1982 [JP] Japan .................................. 57-033979
Apr. 24, 1982 [JP] Japan .................................. 57-068075
May 17, 1982 [JP] Japan .................................. 57-081571

[51] Int. Cl.⁴ ............................................. G03G 9/08
[52] U.S. Cl. ...................................... 430/107; 430/110
[58] Field of Search ...................... 430/120, 106.6, 108, 430/107

[56] References Cited
U.S. PATENT DOCUMENTS 4,433,040 2/1984 Niimura et al. ...................... 430/106

Primary Examiner—John L. Goodrow

[57] ABSTRACT

A two-component dry-type developer which comprises carrier particles coated with silicone resin and toner particles containing as a negative polarity control agent a monoazo metal complex dye. As the monoazo metal complex dye, the following metal complex dye is preferable for use in this two-component dry-type developer:

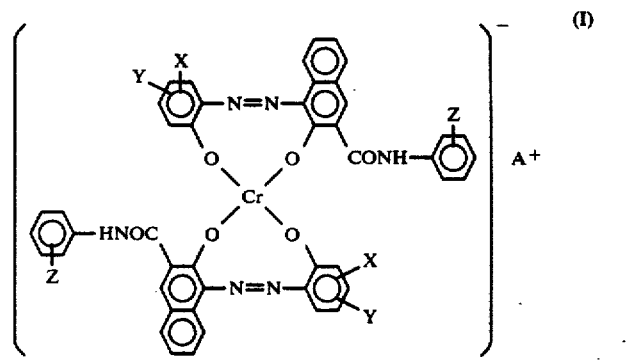

wherein X, Y and Z independently represent hydrogen, halogen, a carboxyl group, a hydroxyl group, a nitro group, a sulfo group or a sulfonamide group; and $A^+$ represents $H^+$, $K^+$, $Na^+$ or an aliphatic ammonium cation.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *